Patented July 14, 1942

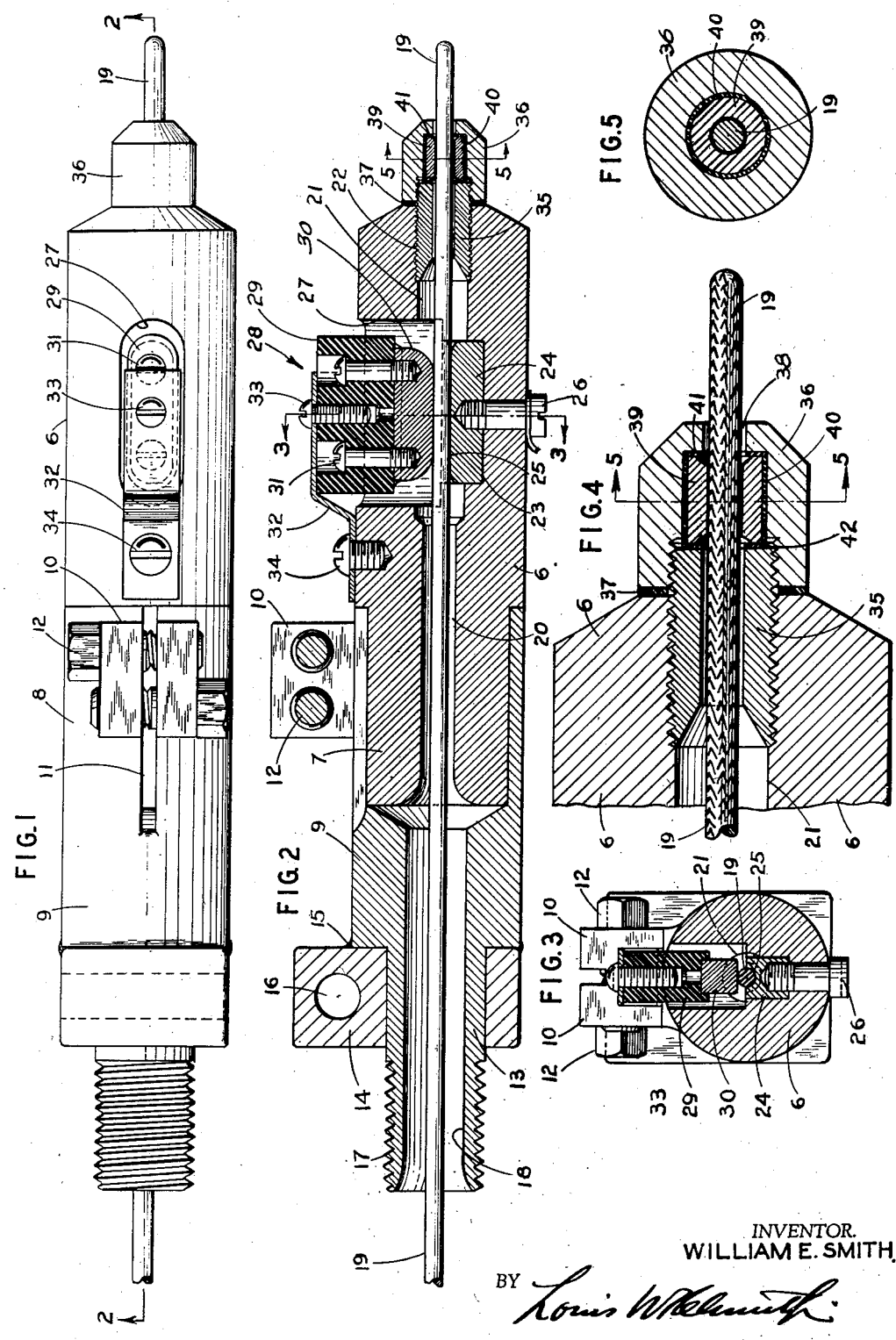

2,289,938

UNITED STATES PATENT OFFICE 2,289,938

METALLIC ARC WELDING NOZZLE

William E. Smith, Detroit, Mich., assignor to The Midland Steel Products Company, Cleveland, Ohio, a corporation of Ohio Application March 27, 1941, Serial No. 385,492

9 Claims. (Cl. 219—8)

This invention relates to new and useful improvements in metallic arc welding and particularly to high speed welding at a rate so high as to render the feeding of the electrode wire, without arcing, burning, flash accumulation and excessive wear upon the feed nozzle, a serious problem.

An important object of the invention is to provide a feed nozzle through which the welding wire is fed to the work and held in spaced relation thereto in order to reduce arcing, burning, flash accumulation and wear, to the very minimum.

Another object of the invention is to completely insulate one of the conductors for the electrical energy to the wire, from the nozzle and to completely insulate the wire guide in the nozzle tip from the nozzle to reduce arcing and burning between the wire and the tip, and to prevent the accumulation of flash on the tip and around the feed orifice therethrough.

Other objects and advantages of the invention will become apparent during the course of the following description.

In the accompanying drawing forming a part of the application and wherein like numerals are employed to designate like parts throughout the several views, Fig. 1 is a side elevation of the improved nozzle, Fig. 2 is a longitudinal section through the same taken on the line 2—2 of Fig. 1, Fig. 3 is a transverse section taken on the line 3—3 of Fig. 2, Fig. 4 is an enlarged longitudinal section of the tip end of the nozzle, Fig. 5 is a transverse section of the same taken on the line 5—5 of Fig. 4.

To appreciate the full import of the problem involved, it is necessary to comprehend the unusual high speed of welding performed by the apparatus. As stated in my copending application Serial No. 370,498 filed December 17, 1940, a welding head is disclosed which lays a weld between parts at the rate of around 140 inches per minute using amperage as high as 700 amps. and approximately 50 volts. This means that the fusible electrode wire passes through the nozzle at a rate of approximately 54 inches per minute. The wire is furnished with a rough or knurled external surface to increase traction and electrical conductance and its effect upon all parts with which it contacts, is similar to the passage of a rat-tail file thereover. This naturally wears the parts severely and widens the electrical gap between them and the wire, to the extent of causing arcing, sticking of the electrode wire and other detrimental effects to cause stoppage of the apparatus for repairs and replacement.

Referring now more particularly to the drawing in detail, the numeral 6 designates a cylindrical welding nozzle body having its inner end 7 of reduced diameter to fit and be securely clamped in the split end 8 of a tubular holder 9 by the provision of a pair of ears 10 on the opposed edges of the slit 11, with oppositely extending screws 12 threaded through the ears to squeeze the split end of the holder firmly about the reduced end of the nozzle body. This holder 9 is provided at its inner end with a reduced extension 13 on which a collar 14 is secured, as by welding 15 to the holder. This collar is provided with an upstanding ear having an orifice 16 extending transversely to the longitudinal dimension of the holder for the attachment of the lead of an electrical conductor for supplying electrical energy to the nozzle, or it may be used to assist in the mounting of the nozzle. The free end of the holder 9 is externally screw threaded as at 17 for attaching the holder to the welding head or to a guide table, in a manner well understood in the art. The holder 9 is provided with an enlarged longitudinal bore 18 of a diameter exceeding many times the diameter of the metallic arc welding wire or electrode 19 to be fed longitudinally therethrough. The holder 9, may, if desired, be constructed of insulating material in which event the welding current can be led into the nozzle and wire as will be described hereinafter.

The nozzle body 6 is provided with a longitudinally extending bore 20 several times larger than the diameter of the wire 19 to prevent contact therewith and accidental arcing, and this bore at the outer end of the nozzle is enlarged as at 21 and at its extreme end is provided with internal screw threads 22. The enlarged portion 21 of the bore is provided at one side with a rectangular recess or seat 23 to snugly receive an electrical contact block 24 of good electrical conducting material such as copper or a copper alloy. This contact block extends into the enlarged bore such distance as to engage the electrode wire 19 and hold it spaced from and centralized with respect to the bores 20 and 18. The surface of the contact block which engages the wire is provided with a longitudinally extending arcuate groove 25 to embrace approximately one-half of the diameter of the welding wire. The conductor block is provided with a central threaded opening to receive a screw 26 extending through the nozzle body 6 for rigidly fastening the conductor in place in its seat or recess. If desired, an electrical lead can be secured to this screw 26 for the conduction of electrical energy into the contact piece 24 and thus into the welding wire 19. This conductor block is arranged close to the work end of the nozzle and the free end of the weld wire to minimize heating of the wire and nozzle as well as to get the source of electrical energy as close as possible to the work.

In order to firmly press the wire 19 into contact with the groove 25 of the conductor block 24 to insure proper electrical contact and conduction and to preclude any possible arcing between the wire and any portions of the nozzle, the latter is provided with a transverse opening 27 extending from the enlarged bore all the way through the exterior surface of the nozzle, and pressure means designated in general by the numeral 28 is positioned in this recess with good clearance therein for engagement with the weld wire 19. This pressure means is composed of a block of insulation 29 freely movable in the opening 27 and having its inner face provided with a removable hardened steel contact block 30 removably secured to the insulating block by means of the counter-sunk screws 31 in the insulation block. To prevent any possible looseness or accidental turning of the block 30 with respect to the insulation block, the latter is provided with a longitudinally extending channel, as best shown in Fig. 3 for seating of the block 30 therein. In order to urge the pressure block inwardly of the opening 27 and the block 30 into firm engagement with the wire, a stiff flat spring 32 is secured to the center of the pressure block by means of the screw 33 and the other end of the spring is secured to the nozzle 6 by the screw 34. This spring has an offset portion as shown and it is normally stressed by the wire passing between the blocks 24 and 30 so that the latter firmly presses the wire into firm electrical contact with the conductor block 24. By having only one live contact engaging the wire 19, to one side of the nozzle, there is absolutely no arcing between the pressure block or pad and wire or between it and the nozzle bore in which it operates, due to the great spacing thereof and its insulating qualities.

The outer end of the nozzle 6 has threaded therein a sleeve 35 of good conducting material such as copper or a copper alloy. The outer end of this sleeve projects beyond the outer end of the nozzle to threadedly receive a tip 36 which is electrically insulated from the end of the nozzle by an insulating washer 37. This tip is provided with a bore 38 in which the electrode wire 19 has slight clearance to avoid the excessive wear which the wire would impose on this opening in its rapid feeding therethrough. The tip 36 is also counter-bored to receive and clamp therein a wear resisting electrode guide sleeve 39 through which the electrode is fed. This guide sleeve has only very light tolerance between it and the wire 19 and is preferably made from stellite or hardened steel to resist the wear from abrasion of the wire in passing therethrough at high speeds. This guide sleeve 39 is insulated from the tip and sleeve 35 by means of its being positioned within an insulating sleeve 40 with insulating washers 41 and 42 disposed at the ends of the guide sleeve 39 within the tip to completely insulate the same therefrom. At the same time, the inner insulating washer 42 provides ample insulation between the two sleeves 35 and 39 thereby completely electrically isolating the hardened guide sleeve 39. Thus, since the primary guide sleeve 39 is completely insulated on the tip and nozzle, there is removed all danger of arcing between the electrode and the guide sleeve and sticking of the electrode which heretofore has been a severe point of vulnerability of previous nozzles which have been tried in this high speed welding operation. Also, since there is only one live contact or conductor block employed in the nozzle, all danger of arcing and sticking at this point is likewise eliminated. Since the welding wire is effectively held spaced from other parts of the nozzle, the life of the tip and nozzle has been tremendously increased. Since the tip 36 is completely insulated from the nozzle, the excessively welding flash from high speed welding is precluded, to a large degree, from adhering to the tip and interfering with the smooth feed of the wire therethrough as it is consumed in the work.

If desired, the entire nozzle and tip 36 including the attachment sleeve 35 and holder 9 may be constructed of hard insulating material such as "Bakelite" or the like with only the conductor block 24 constructed of metal or good conducting material, in which the electrical current is led into this conductor block through the screw 26. Since the bore through such nozzle of insulating material is much larger than the diameter of the weld wire fed therethrough which is held in spaced relation to the walls of the bore by the arrangement of the conductor block, pressure means and hardened guide sleeve 39 holding the wire centralized in the bore and free of contact therewith, no abrasive wear will be imposed upon the nozzle bore by the wire.

As another alternative, the nozzle may be constructed of metal with the attachment sleeve 35 constructed of electrical insulating material such as "Bakelite," in which event the tip 36 could be constructed of like material with a hardened metallic wear resisting guide sleeve 39 positioned therein, in which event the insulating tube 40 and washers 37, 41 and 42 could be eliminated. However, in view of the fact that it is desired to pass the electric current into the weld wire as close to its free end as possible, the use of a metallic attachment sleeve 35 is very desirable. To further realize this desirable point, the conductor block 24 and pressure means 28 may be located closer to the free end of the nozzle and substantially where the attachment sleeve 35 is located, thereby eliminating the necessity of the use of the attachment sleeve entirely. In such modification, the tip 36 could be provided with an integral threaded shank to thread into the end of the nozzle or any other suitable form of attachment could be employed. It is to be understood that various changes in the size, shape and arrangement of parts may be resorted to without departing from the spirit of the invention or the scope of the appended claims.

I claim:

1. A metallic arc welding nozzle comprising a member having a longitudinally extending bore of a diameter larger than the welding wire passed therethrough, a wire guide tip secured to one end of the nozzle, a wear resisting sleeve mounted in the tip and being completely insulated therefrom and having an opening of a size just slightly larger than the wire, said wear resisting sleeve supporting the wire in spaced relation to said bore, and an electrical contact arranged in said bore adjacent the tip for conveying electrical current to the wire and assisting in supporting it clear of the bore.

2. A metallic arc welding nozzle comprising a member having a longitudinally extending bore of a diameter larger than the welding wire passed therethrough, and a wear resisting sleeve associated with said nozzle completely insulated therefrom and having a guide opening for the wire to hold the latter spaced from the walls of said bore.

3. A metallic arc welding nozzle comprising a member having a longitudinally extending bore of a diameter larger than the welding wire passed therethrough, an externally threaded sleeve of insulating material threaded into the end of the nozzle, a tip threaded on said sleeve, an insulating washer between the tip and the end of the nozzle, and said tip having a wear resisting sleeve therein with an opening just slightly larger than the diameter of the wire to hold the same spaced from the walls of said bore to prevent arcing and burning of the tip.

4. A metallic arc welding nozzle having a longitudinal bore through which the welding wire is fed in spaced relation to the walls of the bore, a conductor arranged in said bore in contact with the wire, pressure means insulated from the nozzle and serving to press the wire into good electrical contact with the conductor, and a guide for the wire in said bore insulated therefrom and being highly resistant to abrasive action of the wire passing therethrough and serving in conjunction with the conductor to space the wire from the bore to prevent arcing between the wire and nozzle.

5. A metallic arc welding nozzle having a longitudinal bore through which electrode wire is fed, a sleeve of insulating material threaded into the end of the bore at the end of the nozzle and extending beyond the free end thereof, a tip threaded on to the end of said sleeve and a hardened metallic guide in said tip insulated therefrom to resist abrasive action of the wire passing therethrough.

6. A metallic arc welding nozzle through which electrode wire is fed longitudinally, an electrical conductor in said nozzle for sliding contact with said wire, and a wear resisting guide in said nozzle through which the wire passes, said guide being insulated from the conductor to prevent arcing and burning.

7. A metallic arc welding nozzle through which electrode wire is fed longitudinally, an electrical conductor in said nozzle for sliding contact with said wire, an insulating tube in said nozzle, a wear resisting guide in said tube through which said wire passes, and insulating washers abutting the ends of said guide to completely insulate the same from the nozzle.

8. A metallic arc welding nozzle having a bore extending longitudinally thereof and a lateral opening extending transversely from said bore to the external surface of the nozzle, a removable electrical conductor fixed in said bore opposite said lateral opening and over which welding wire slides in passing through said bore, and a pressure member of insulating material spring supported in said lateral opening and in spaced relation to all walls thereof and carrying a hardened metallic piece to press the wire into contact with said fixed electrical conductor.

9. A metallic arc welding nozzle having a bore extending longitudinally thereof and a lateral opening extending transversely from said bore to the external surface of the nozzle, a removable electrical conductor fixed in said bore opposite said lateral opening and over which welding wire slides in passing through said bore, a pressure member of insulating material in said lateral opening spaced from the walls thereof, and a flat spring fastened by an adjusting screw at one end to said nozzle and at its opposite end to said pressure member to urge the latter against the wire and press it into contact with said fixed electrical conductor.

WILLIAM E. SMITH.